(12) United States Patent
Kadam et al.

(10) Patent No.: US 10,836,339 B2
(45) Date of Patent: Nov. 17, 2020

(54) AIRBAG INCLUDING REINFORCEMENTS

(71) Applicant: Ford Global Technologies, LLC, Dearborn, MI (US)

(72) Inventors: Mangesh Kadam, Canton, MI (US); Yuqin Zhao, Troy, MI (US); Leonard Shaner, New Baltimore, MI (US); Matt Alan Niesluchowski, Clarkston, MI (US); Srinivas Reddy Malapati, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 126 days.

(21) Appl. No.: 16/140,984

(22) Filed: Sep. 25, 2018

(65) Prior Publication Data

US 2020/0094767 A1    Mar. 26, 2020

(51) Int. Cl.
*B60R 21/231*    (2011.01)
*B60R 21/203*    (2006.01)

(52) U.S. Cl.
CPC .......... *B60R 21/231* (2013.01); *B60R 21/203* (2013.01)

(58) Field of Classification Search
CPC .. B60R 21/203; B60R 21/231; B60R 21/2334
See application file for complete search history.

(56) References Cited

U.S. PATENT DOCUMENTS

| | | | |
|---|---|---|---|
| 5,947,227 A * | 9/1999 | Kempf | B60W 30/18 180/335 |
| 6,382,661 B1 * | 5/2002 | Sutherland | B60R 21/2032 280/728.2 |
| 6,464,252 B1 * | 10/2002 | Kreuzer | B60R 21/231 280/728.2 |
| 7,441,799 B2 | 10/2008 | Enders et al. | |
| 8,079,615 B2 | 12/2011 | Tanaka | |
| 8,651,522 B2 * | 2/2014 | Hirth | B60R 21/233 280/743.1 |
| 9,096,257 B1 * | 8/2015 | Faruque | B62D 1/11 |
| 9,272,681 B1 * | 3/2016 | Enders | B60R 21/21 |
| 9,758,121 B2 | 9/2017 | Paxton et al. | |
| 10,065,595 B1 * | 9/2018 | Kipnis | B60R 21/01 |
| 2004/0207186 A1 * | 10/2004 | Kai | B60R 21/203 280/731 |
| 2005/0121889 A1 * | 6/2005 | Enders | B60R 21/203 280/731 |
| 2006/0006631 A1 * | 1/2006 | Meissner | B60R 21/231 280/729 |
| 2016/0229369 A1 * | 8/2016 | Thomas | B60R 21/207 |
| 2017/0057453 A1 * | 3/2017 | Morris | B60R 21/233 |
| 2017/0166159 A1 * | 6/2017 | Shin | B60R 21/231 |
| 2017/0253211 A1 * | 9/2017 | Choi | B60R 21/16 |
| 2018/0086298 A1 | 3/2018 | Nakanishi et al. | |
| 2018/0290509 A1 * | 10/2018 | Pedersoli | G09F 21/04 |

FOREIGN PATENT DOCUMENTS

| | | |
|---|---|---|
| JP | H11342819 A | 12/1999 |
| JP | 2008201251 A | 9/2008 |

* cited by examiner

*Primary Examiner* — Barry Gooden, Jr.
(74) *Attorney, Agent, or Firm* — Frank A. MacKenzie; Bejin Bieneman PLC

(57) ABSTRACT

An airbag assembly includes an airbag inflatable to an inflated position and reinforcements fixed to the airbags. The reinforcements are rigid relative to the airbag and are moveable with the airbag to the inflated position.

17 Claims, 14 Drawing Sheets

AIRBAG INCLUDING REINFORCEMENTS

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1:
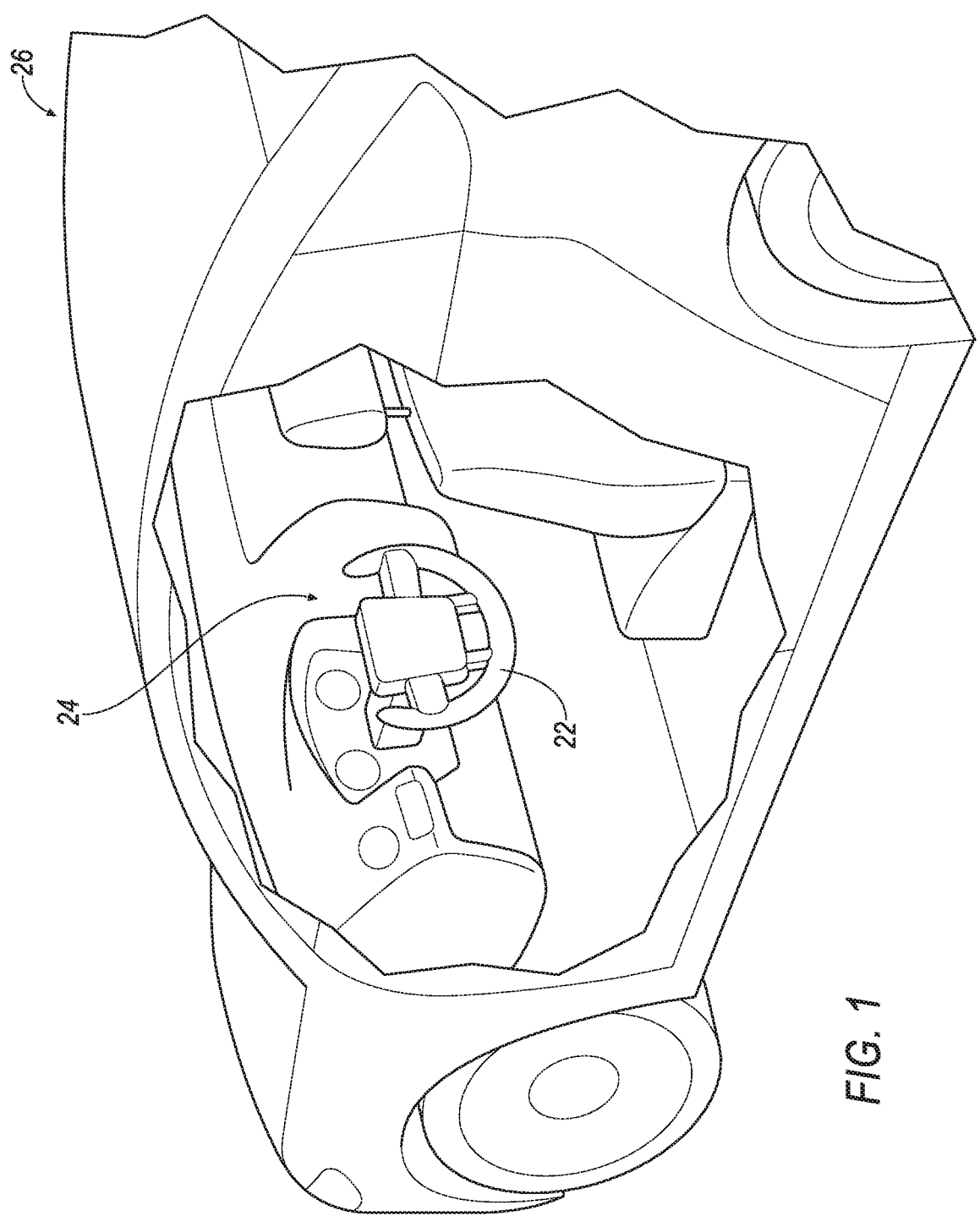
FIG. 1 is a perspective of a portion of the vehicle with a steering wheel.

An airbag assembly includes an airbag inflatable to an inflated position. The airbag assembly includes reinforcements that are rigid relative to the airbag and fixed to the airbag and moveable with the airbag to the inflated position. The reinforcements are connected to each other in a round pattern. The reinforcements may be pivotally connected together as a radially expandable linkage. Each reinforcement may be hinged to at least two adjacent ones of the reinforcements. Each reinforcement may be elongated between two ends, the two ends being hinged to adjacent ones of the reinforcements. Each reinforcement may have a midpoint hinged to a midpoint of an adjacent one of the reinforcements. The reinforcements may be pivotally connected together as an unfoldable linkage. The airbag assembly may include a housing supporting the airbag, each reinforcement including an end hinged to the housing and an end fixed to the airbag. Each reinforcement may be curved about an axis extending through the ends of the reinforcement. The reinforcements may be supported entirely by the airbag.

An airbag assembly includes a housing. The airbag assembly includes an airbag supported by the housing and inflatable to an inflated position. A linkage includes links that are connected to each other and are rigid relative to the airbag. The linkage is fixed to the airbag and is moveable with the airbag to the inflated position in which the linkage is spaced from the housing. The links may be pivotally connected together. The linkage may be round. Each link may be hinged to at least two adjacent ones of the links. Each link may be elongated between two ends, the two ends being hinged to adjacent ones of the links. Each link may have a midpoint hinged to a midpoint of an adjacent one of the links.

An airbag assembly includes a housing. The airbag assembly includes an airbag supported by the housing and inflatable to an inflated position. The airbag assembly includes pairs of links each including an inner link connected to the housing and an outer link connected to the inner link and to the airbag. The inner link is rigid relative to the airbag and the outer link is flexible relative to the inner link. The airbag assembly may include a revolute joint between the inner link and the housing. The airbag assembly may include a tether between the inner link and the outer link. The airbag assembly may include cross links connecting adjacent ones of the outer links. Each cross link may be hinged between the adjacent ones of the outer links.

With reference to the Figures, wherein like numerals indicate like parts throughout the several views, an airbag assembly 10 includes an airbag 12 inflatable to an inflated position and reinforcements 14, 114, 214 fixed to the airbag 12. The reinforcements 14, 114, 214 are rigid relative to the airbag 12 and are moveable with the airbag 12 to the inflated position.

The reinforcements 14, 114, 214 reinforce the airbag 12 to resist deformation of the airbag 12 at the reinforcements 14, 114, 214. The reinforcements 14, 114, 214, for example, may reinforce the airbag 12 at areas of the airbag 12 that do not impact an external reaction surface when the airbag 12 is inflated and impacted by an occupant, e.g., at a gap 24 in a partially round steering wheel 22, as set forth further below.

One embodiment of the reinforcements 14 is shown in FIGS. 2-5 in which the reinforcements 14 are arranged as a linkage 16 including inner links 18 and outer links 20 that, when deployed by inflation of the airbag 12, unfolds to spread across the gap 24 in the steering wheel 22 to reinforce the airbag 12 at the gap 24. Another embodiment is shown in FIGS. 6-9 in which the reinforcements 114 are arranged as a linkage 116 that is radially expandable and round (and more specifically, for example, circular). The linkage 116 is supported by the airbag 12 and moves with the airbag 12 as the airbag 12 inflates during which the linkage 116 is expanded by inflation of the airbag 12. Another embodiment is shown in FIGS. 10-14 in which the reinforcements 214 open, e.g., like flower petals and/or a colander, upon inflation of the airbag 12.

The vehicle 26 may be any passenger or commercial automobile such as a car, a truck, a sport utility vehicle, a crossover vehicle, a van, a minivan, a taxi, a bus, etc. The vehicle 26 includes a passenger cabin to house occupants, if any, of the vehicle 26. The vehicle 26 includes an instrument panel (not numbered) disposed at a vehicle forward end of the passenger cabin. The instrument panel may support vehicle 26 controls, including the steering wheel 22. The vehicle 26 includes a windshield (not numbered) at the forward end of the passenger cabin and extending above the instrument panel.

With reference to FIG. 1, the steering wheel 22 may be, for example, partially round, i.e., includes arcs that are not continuous. The arcs may have a common axis or a different axis. The steering wheel 22 may have a rim that is engageable by the hands of the occupant and the rim may be partially round. As an example, the rim may be a truncated ring. The partially round steering wheel 22 includes a gap 24 between ends of the rim, e.g., between ends of the truncated ring. As another example, the steering wheel 22 may include two paddles for gripping by the hands of the occupant, in which case the gap 24 is between the paddles. The gap 24 is shown at a top of the steering wheel 22 in the Figures, and additionally or alternatively, one or more gap 24s may be at any location on the periphery of the steering wheel 22. Alternatively, the steering wheel 22 may be any suitable size and shape, e.g., a traditional round steering wheel 22.

The airbag assembly 10 includes a housing 28 supporting the airbag 12. The housing 28 may be supported on the steering wheel 22. The housing 28 may support the airbag 12 when the airbag 12 is in both the uninflated position and the inflated position.

The airbag assembly 10 includes an inflator 30. The inflator 30 may be supported by the housing 28. The inflator 30 may be connected to the airbag 12. Upon receiving a signal from, e.g., the vehicle 26 controller, the inflator 30 may inflate the airbag 12 with an inflatable medium, such as a gas. The inflator 30 may be, for example, a pyrotechnic inflator that uses a chemical reaction to drive inflation medium to the airbag 12. The inflator 30 may be of any suitable type, for example, a cold-gas inflator.

As set forth above, the airbag 12 is supported by the housing 28 and is inflatable from an uninflated position to an inflated position. The airbag 12 may be formed of a woven polymer or any other material. Examples include woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

As set forth above, the reinforcements 14, 114, 214 are fixed to the airbag 12. As examples, the reinforcements 14, 214 may have one end fixed to the airbag 12 and another end fixed to another component, e.g., the housing 28 of the airbag assembly 10, as shown in FIGS. 2-5 and 10-14. As another example, the entire reinforcement 114 may be fixed to the airbag 12, as shown in FIGS. 6-9. The reinforcements 14, 114, 214 may be fixed to the airbag 12 in any suitable fashion, e.g., stitching, adhesive, and/or welding, etc.

With continued reference to FIGS. 2-14, the reinforcements 14, 114, 214 are moveable with the airbag 12 to the inflated position. In other words, since the reinforcements 14, 114, 214 are fixed to the airbag 12, the airbag 12 moves the reinforcements 14, 114, 214 as the airbag 12 is inflated, as shown in the figures. The airbag 12 moves the reinforcements 14, 114, 214 from a undeployed position (i.e., prior to inflation) to a deployed position in which the reinforcements 14, 114, 214 locally reinforce, i.e., stiffen, the airbag 12. The reinforcements 14, 114, 214 may remain fixed to the airbag 12 throughout inflation of the airbag 12.

The reinforcements 14, 114, 214 may also be called stiffeners because the reinforcements 14, 114, 214 locally stiffen the airbag 12 to accommodate for a lack of a reaction surface behind the airbag 12, e.g., at the gap 24 of the steering wheel 22. As set forth above the reinforcements 14, 114, 214 are rigid relative to the airbag 12. In other words, the airbag 12 is flexible relative to the reinforcements 14, 114, 214. The rigidity of the reinforcements 14, 114, 214 relative to the airbag 12 may be from the shape, size, and or of a material type of the reinforcement 14, 114, 214. The reinforcements 14, 114, 214, for example, may be formed of plastic and/or metal.

The reinforcements 14, 114, 214 may be links that are connected together as the linkage 16, 116. Examples of the linkage 16, 116 are shown in FIGS. 2-5 and 9-14. The linkage 16, 116 may be rigid relative to the airbag 12. In other words, in addition to the reinforcements 14, 114, 214 themselves being rigid relative to the airbag 12, the linkage 16, 116 may be rigid relative to the airbag 12 when in the deployed position, i.e., after inflation of the airbag 12 has caused the airbag 12 to move the linkage 16, 116 to the deployed position. In examples where the reinforcements 14, 114 are links, some or all of the reinforcements 14, 114 may be fixed to the airbag 12. In other words, some of the reinforcements 14, 114 may be fixed to the airbag 12 and others of the reinforcements 14, 114 may be between the housing 28 and the reinforcements 14, 114 fixed to the airbag 12.

With reference to FIGS. 2-9, the reinforcements 14 are pivotally connected together as a linkage 16 that is unfoldable. In other words, the linkage 16 may be folded in the undeployed position and unfolded to the deployed position. For example, the reinforcements 14 may be arranged as pairs of links each including an inner link 18 connected to the housing 28 and an outer link 20 connected to the inner link 18. The outer link 20 is connected to the airbag 12. Upon inflation of the airbag 12, the airbag 12 pulls the outer links 20 to unfold the outer links 20 from the inner links 18, as shown in the progression from FIG. 2 through FIG. 4. Specifically, as an example, the inner links 18 may be connected to the housing 28 at an upper end of the housing 28 and folded downwardly in the undeployed position, in which case the outer links 20 are folded upwardly from the inner links 18 in the undeployed position.

With continued reference to FIGS. 2-9, the linkage 16 includes joints 32 that allow the linkage 16 to unfold from the undeployed position to the deployed position. The joints 32 may be between adjacent reinforcements 14 and between the reinforcements 14 and the housing 28. Each of the joints 32 may be of the same type or the joints 32 may be of different types. As an example, the joint 32 between the inner link 18 and the outer link 20 may be of a different type than the joint 32 between the inner link 18 and the housing 28. As an example, the joint 32 between the inner link 18 and the housing 28 may be, for example, a revolute joint, i.e., restricting movement to rotation about one axis, and the joint 32 between the inner link 18 and the outer link 20 may be a spherical joint, i.e., having three degrees of freedom. As another example, some or all of the joints 32 may be living hinges.

Figure 5:
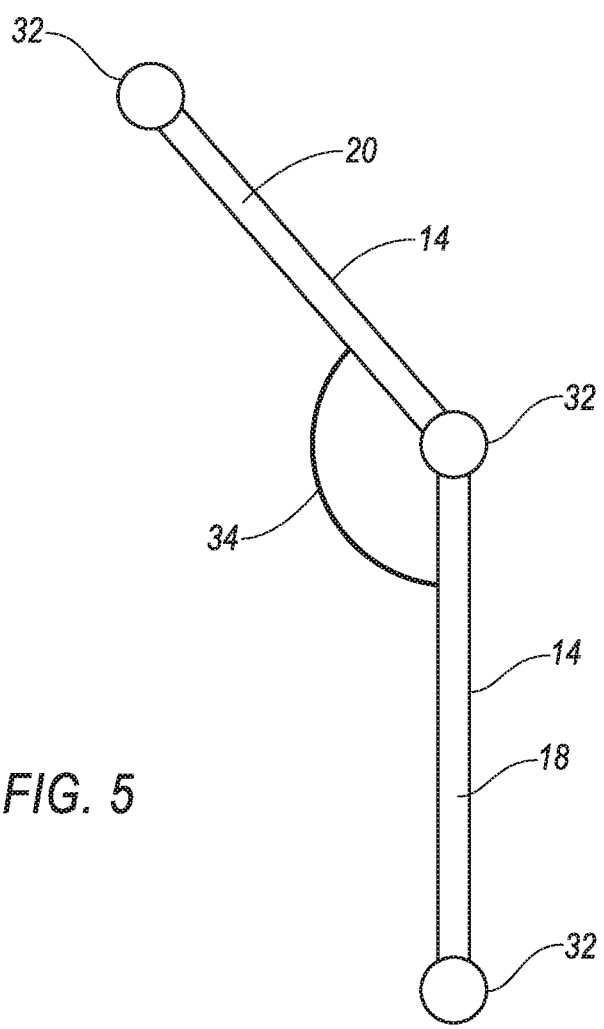
FIG. 5 is a side view of an inner link and an outer link of the airbag assembly of FIG. 2 and a tether extending between the inner link and the outer link.

With reference to FIG. 5, a tether 34 may extend between the inner link 18 and the outer link 20 of each of the pairs. The tethers 34 position the outer links 20 relative to the inner links 18 in the deployed position. In other words, the tethers 34 slow or stop rotation of the outer links 20 relative to the inner links 18 during deployment. During impact of the airbag 12 by the occupant, the tethers 34 resist rotation of the outer links 20 relative to the inner links 18. The tethers 34 may be of any suitable material, e.g., a woven fabric.

Figure 4:
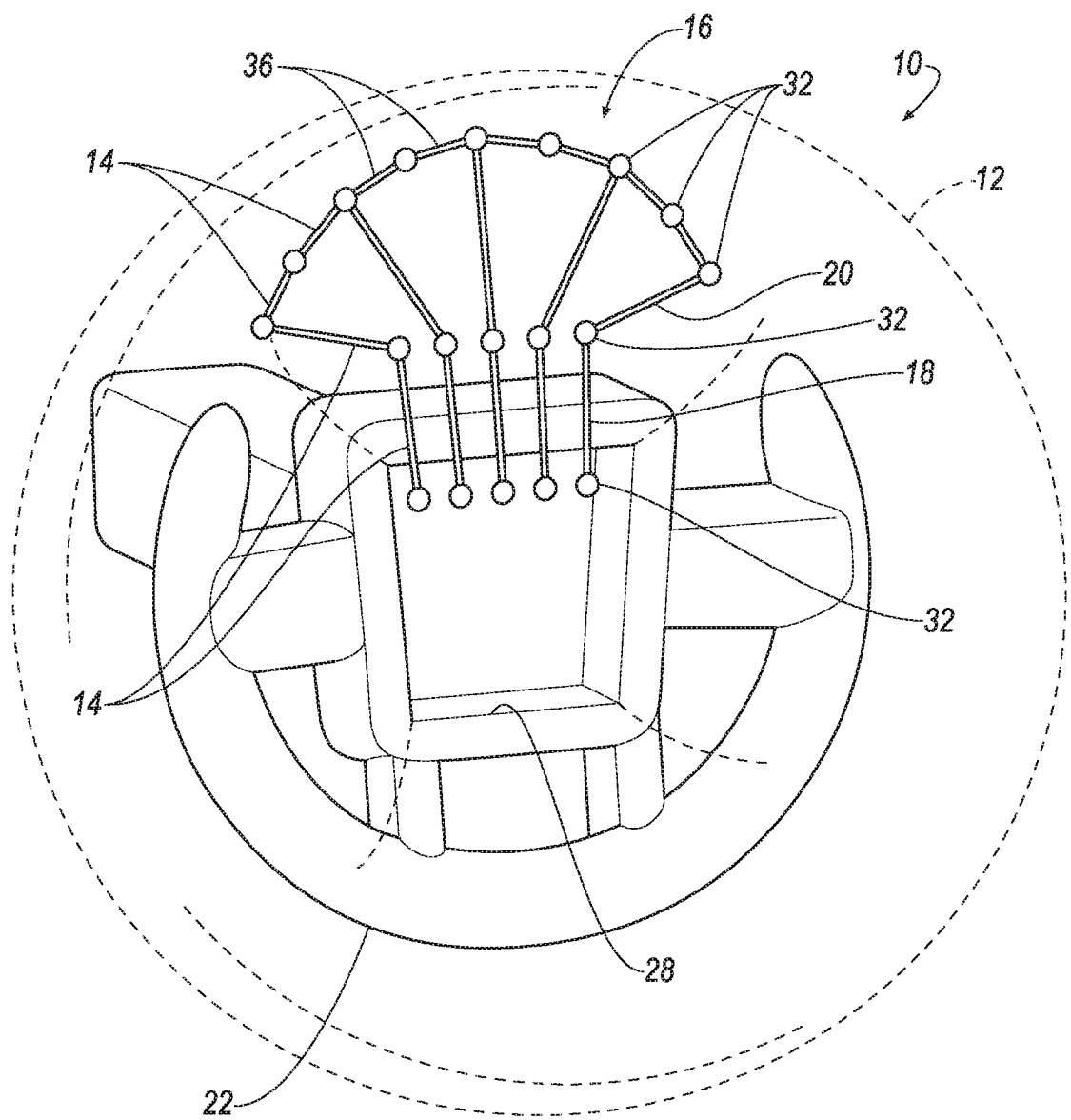
FIG. 4 is a perspective view of the airbag assembly of FIG. 2 with the airbag in the inflated position and the reinforcements in a deployed position.

The linkage 16 may include cross links 36 connecting adjacent ones of the outer links 20. In such a configuration, as shown in FIG. 4, the linkage 16 is fanned across the gap 24 in the deployed position. The cross links 36 may be of the same or different type of material than the inner links 18 and/or the outer links 20.

Figure 2:
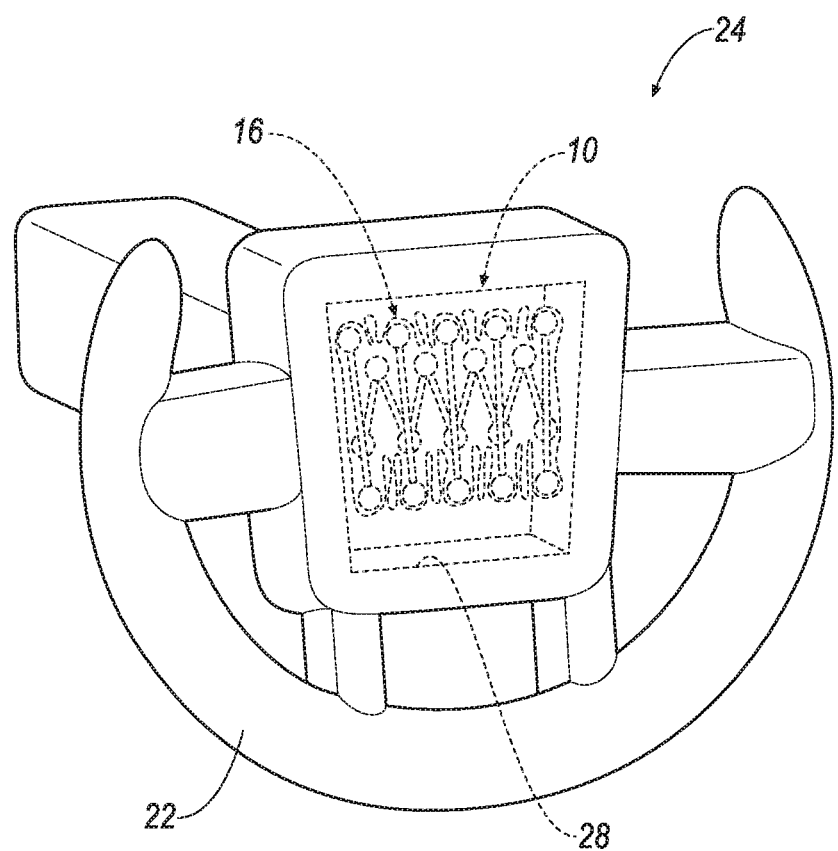
FIG. 2 is a perspective view of the steering wheel with an airbag assembly with an airbag in an uninflated position and including a first embodiment of reinforcements.
Figure 3:
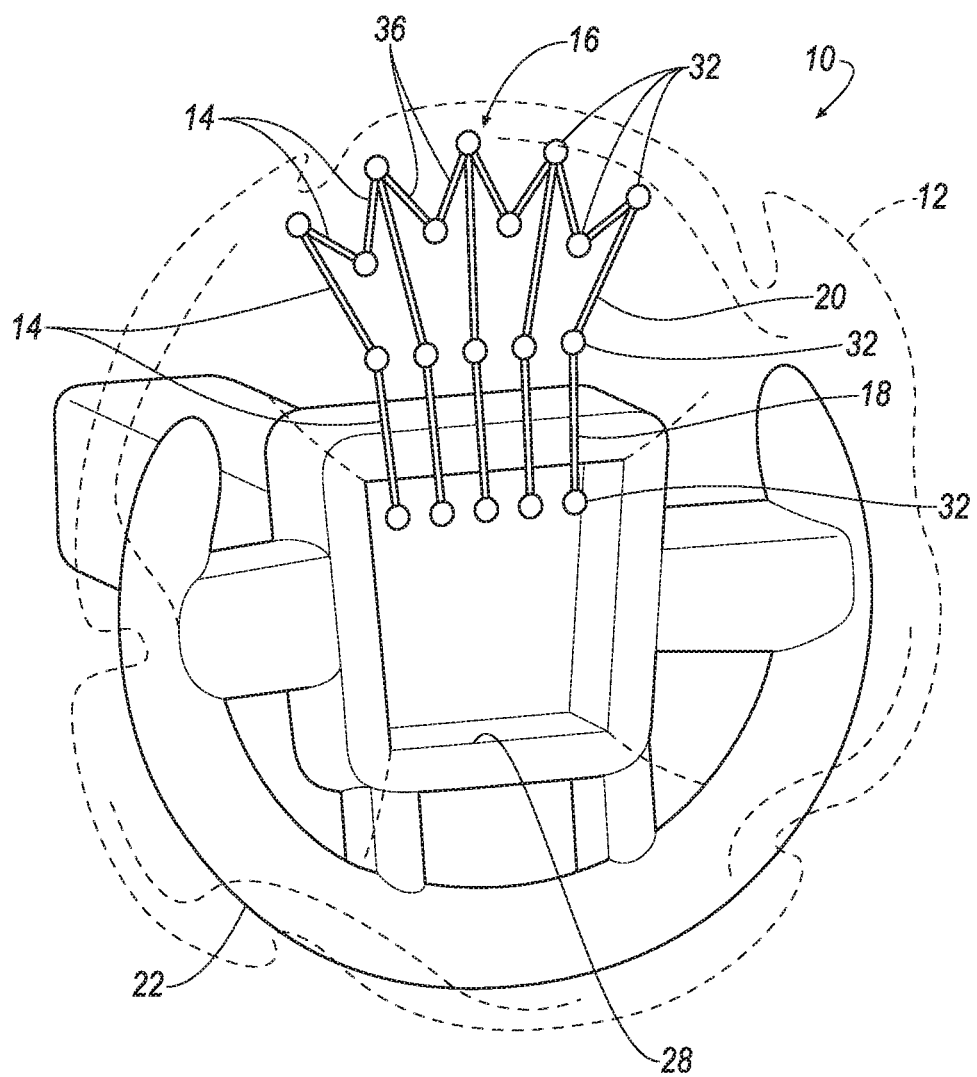
FIG. 3 is a perspective view of the airbag assembly of FIG. 2 with the airbag shown in broken lines between an uninflated position and an inflated position.

In the example shown in FIGS. 2-4, two cross links 36 are between adjacent outer links 20 and are hinged to each other and the respective outer link 20. The cross links 36 may be hinged to each other and to the respective outer link 20 with any suitable type of joint.

With continued reference to FIGS. 2-4, the inner links 18 are rigid relative to the airbag 12 and the outer links 20 may be flexible relative to the inner links 18. In this configuration, in the deployed position, the inner links 18 provide stable positioning for the outer links 20 and the outer links 20 reinforce the airbag 12 while allowing some flex during occupant impact. In one example, the inner links 18 may be formed of metal and/or plastic for relative rigidity and the outer links 20 may be formed of relatively flexible plastic and/or wireform.

Figure 6:
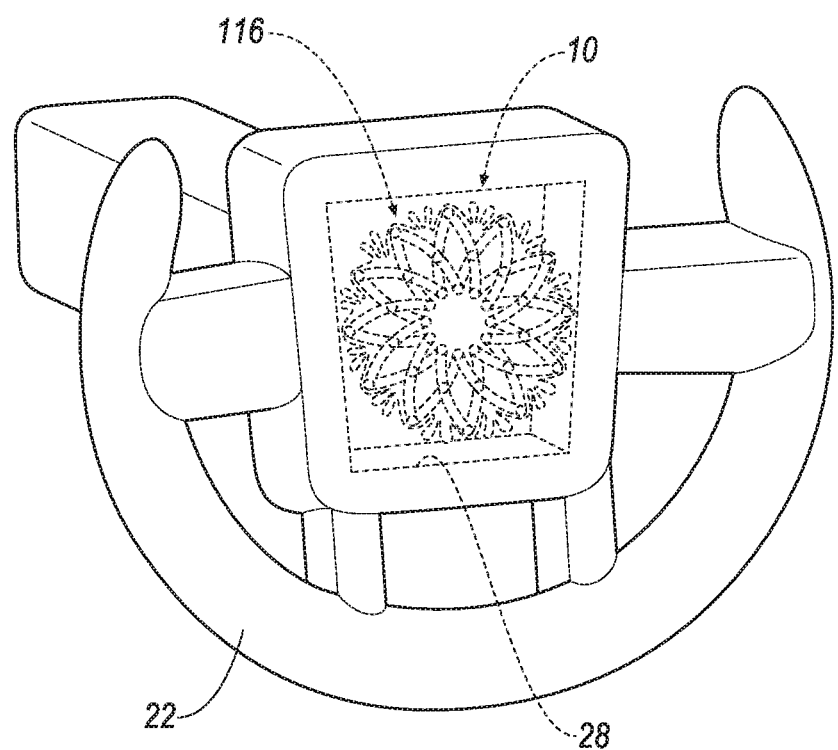
FIG. 6 is a perspective view of the steering wheel with an airbag assembly with an airbag in an uninflated position and including a second embodiment of reinforcements.
Figure 7:
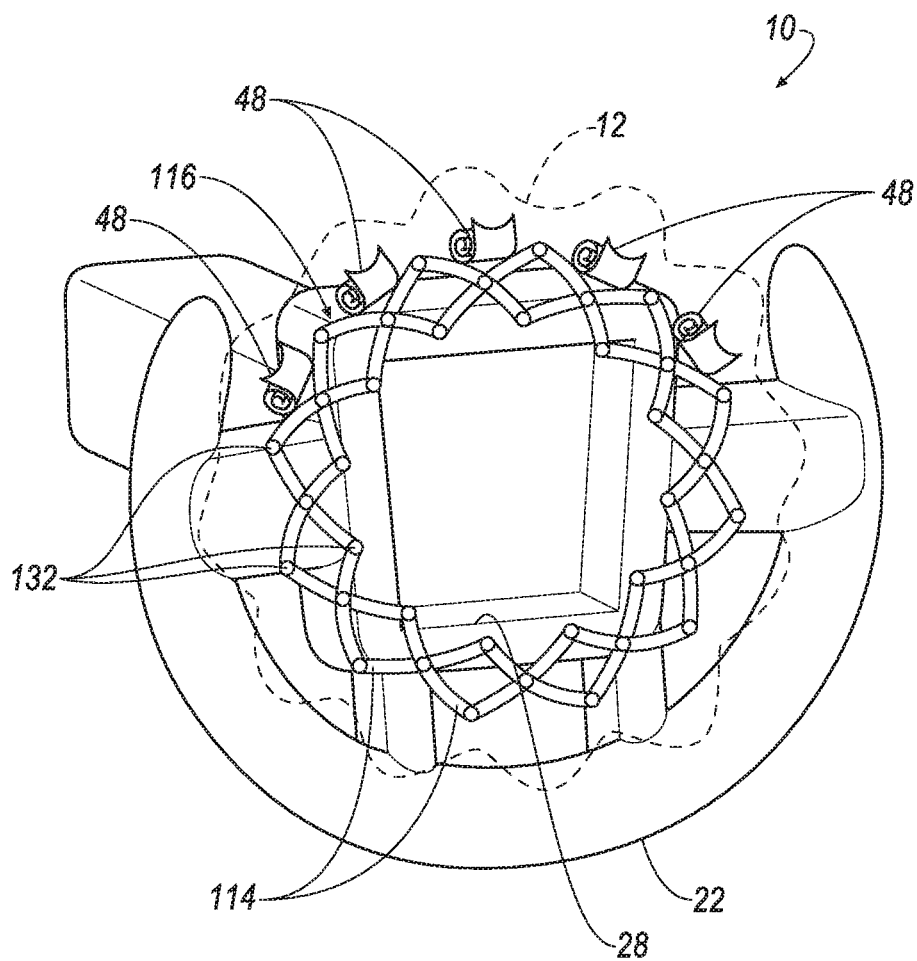
FIG. 7 is a perspective view of the airbag assembly of FIG. 6 with the airbag shown in broken lines between an uninflated position and an inflated position.
Figure 8:
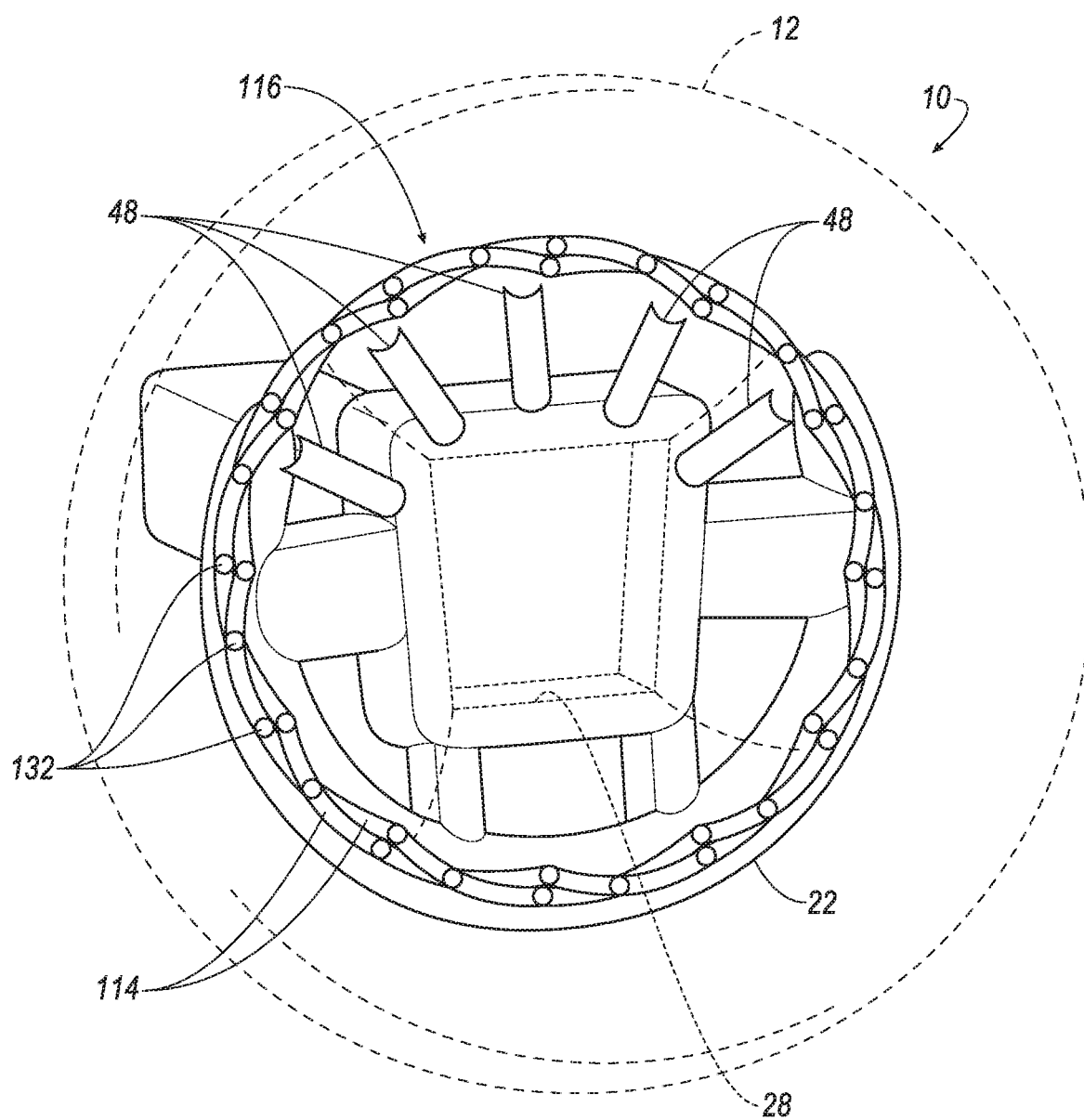
FIG. 8 is a perspective view of the airbag assembly of FIG. 6 with the airbag in the inflated position and the reinforcements in a deployed position.
Figure 9:
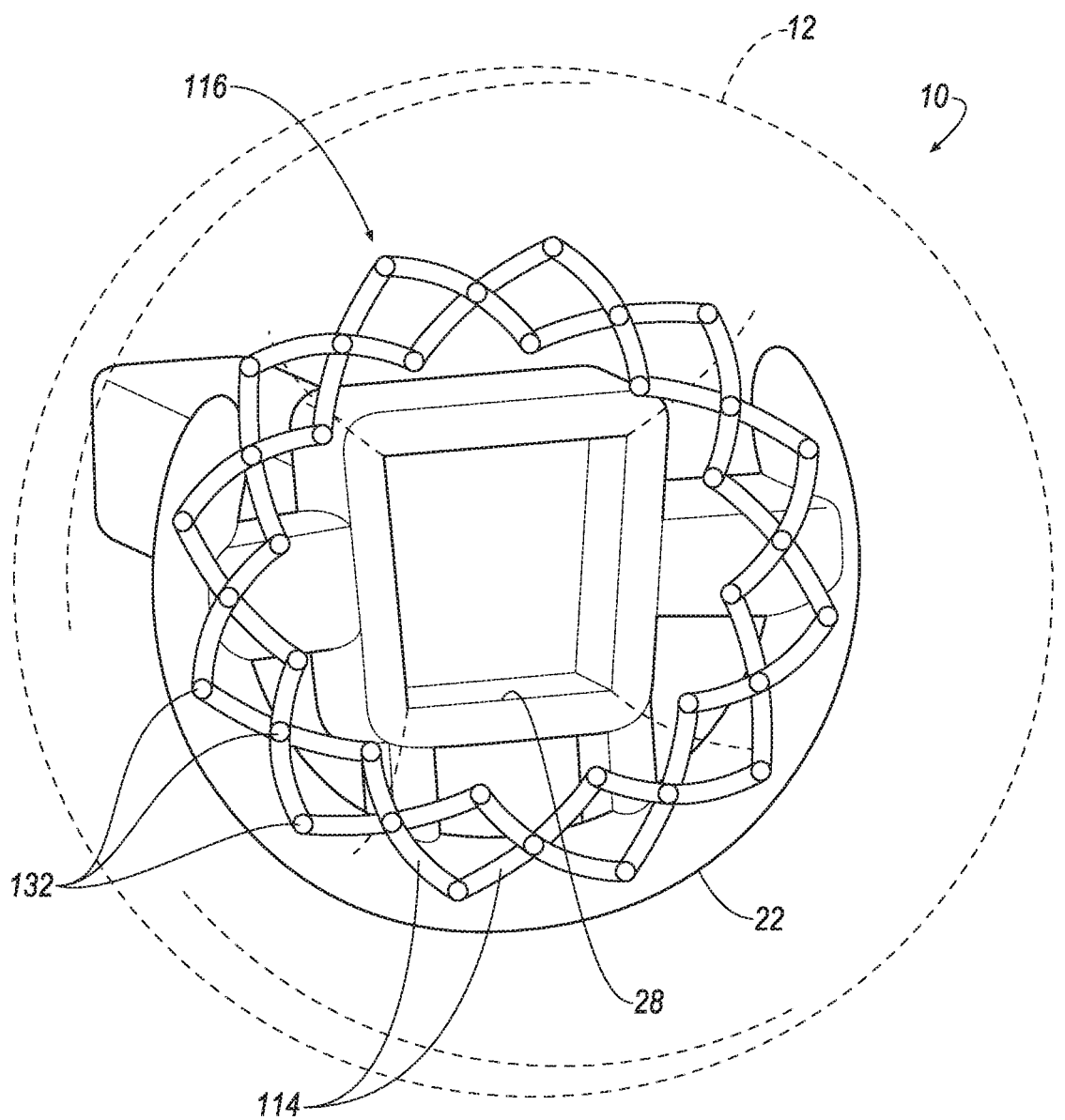
FIG. 9 is a perspective view of another example of the second embodiment of reinforcements.
Figure 10:
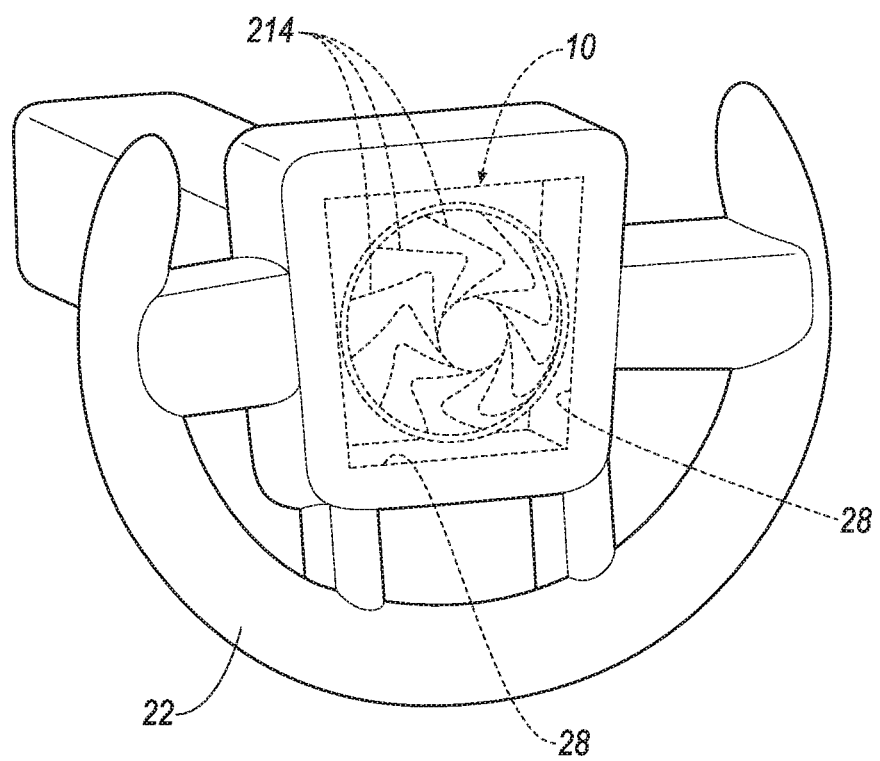
FIG. 10 is a perspective view of the steering wheel with an airbag assembly with an airbag in an uninflated position and including a third embodiment of reinforcements.
Figure 11:
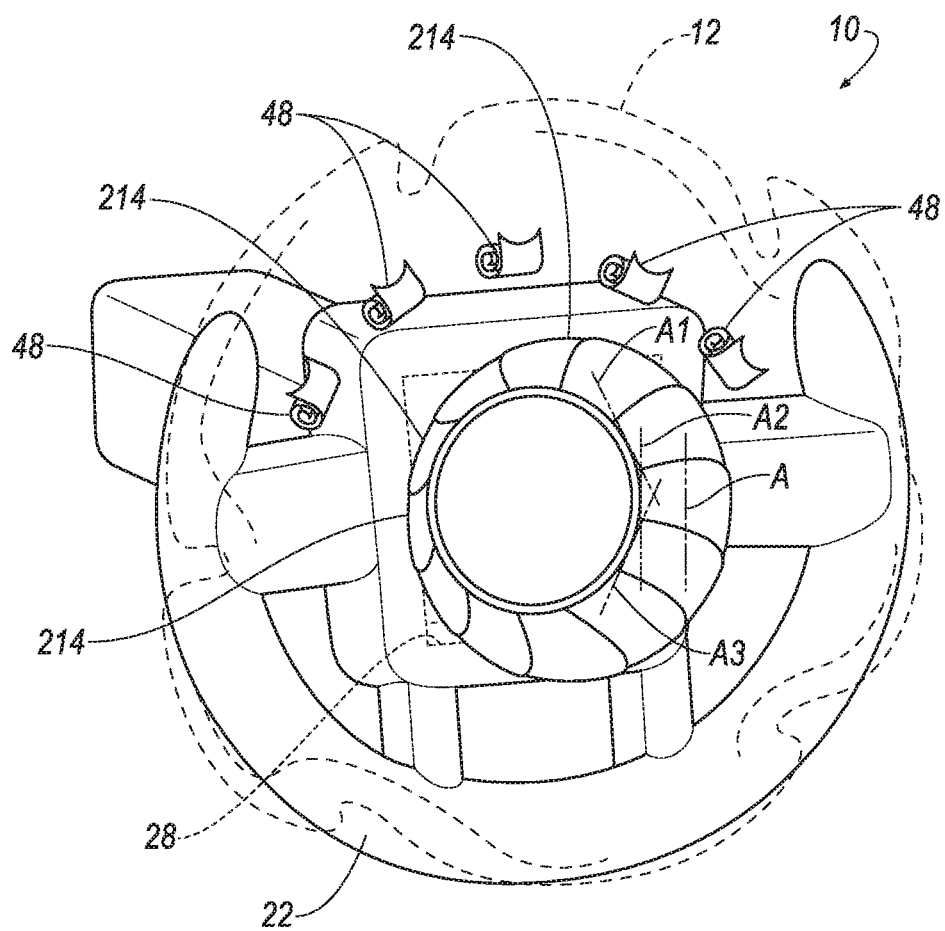
FIG. 11 is a perspective view of the airbag assembly of FIG. 9 with the airbag shown in broken lines between an uninflated position and an inflated position.

With reference to FIGS. 6-9, the reinforcements 114 may be connected to each other in a round pattern. In other words, the linkage 116 is round, i.e., a closed loop, e.g., circle, oval, etc. In the example shown in FIGS. 6-9, the linkage 116 is circular. The reinforcements 114 may be arranged in the round pattern in the undeployed position, as shown in FIG. 6, and in the deployed position, as shown in FIG. 8. FIGS. 6-8 show the progression of the linkage 116 from the undeployed position to the deployed position. In the example shown in FIGS. 6-8, the linkage 116 is fully open in the deployed position. As another example shown in FIG. 9, the linkage 116 is partially open in the deployed position. When partially open, as shown in FIG. 9, the linkage 116 is round. The position of the linkage 116 in the deployed position is controlled by the location of connections of the linkage 116 to the airbag 12.

The linkage 116 may be radially expandable. In other words, the linkage 116 expands radially from the undeployed position to the deployed position. In the example shown in FIGS. 6-8, the linkage 116 remains circular while expanding from the undeployed position to the deployed position.

With continued reference to FIGS. 6-9, the reinforcements 114 are pivotally connected together. More specifically, the reinforcements 114 are pivotally connected together as the expandable linkage 116. Each reinforcement 114 is hinged to at least two adjacent ones of the reinforcements 114. In other words, the linkage 116 includes joints 132 between each of the reinforcements 114 of the linkage 116. For example, each reinforcement 114 is elongated between two ends and the two ends are hinged to adjacent ones of the reinforcements 114. Each reinforcement 114 has a midpoint that may be hinged to the midpoint of an adjacent one of the reinforcements 114.

With continued reference to FIGS. 6-9, the linkage 116 is fixed to the airbag 12 and is moveable with the airbag 12 to the inflated position. The linkage 116 is spaced from the housing 28 in the inflated position, i.e., does not contact the housing 28 in the inflated position. Said differently, the reinforcements 114 are supported entirely by the airbag 12 in the inflated position.

With reference to FIGS. 10-14, the reinforcements 214 are positioned in a round pattern, .g., circle, oval, etc. Specifically, a joint 232 at a proximal end 42 of each reinforcement 214 is fixed relative the housing 28 and the reinforcement 214 is rotatable about the joint 232. The joints 232 are arranged in the round pattern. The joint 232 may be a revolute joint 232. In such an example, the axes of the joints 232 are transverse to each other and arranged in the round pattern (for example axes A1, A2, A3 are identified in FIG. 11). A portion of the reinforcement 214 spaced from the proximal end 42, e.g., a distal end 44, is connected to the airbag 12. Upon inflation of the airbag 12, the airbag 12 pulls the reinforcements 214, e.g., the distal ends 44 of the reinforcements 214, to unfold the reinforcement 214. In such an example, the reinforcements 214 unfold like flower petals and/or a colander.

With continued reference to FIGS. 10-14, a reinforcement assembly 38 may include a base 40 connected to the housing 28 and the reinforcements 214 hinged to the base 40. In such an example, the proximal end 42 of each reinforcement 214 is hinged to the base 40. The base 40 may be ring-shaped and may be fixed to the housing 28 in any suitable fashion, e.g., fasteners, welding, unitary construction, etc.

With continued reference to FIGS. 10-14, each reinforcement 214 may be curved about an axis A between the distal end 44 and proximal end 42 of the reinforcement 214. In other words, the reinforcements 214 curl inwardly from the proximal end 42 to the distal end 44, as shown in the figures. This configuration allows the reinforcement 214 to compactly fold in the undeployed position.

Figure 13:
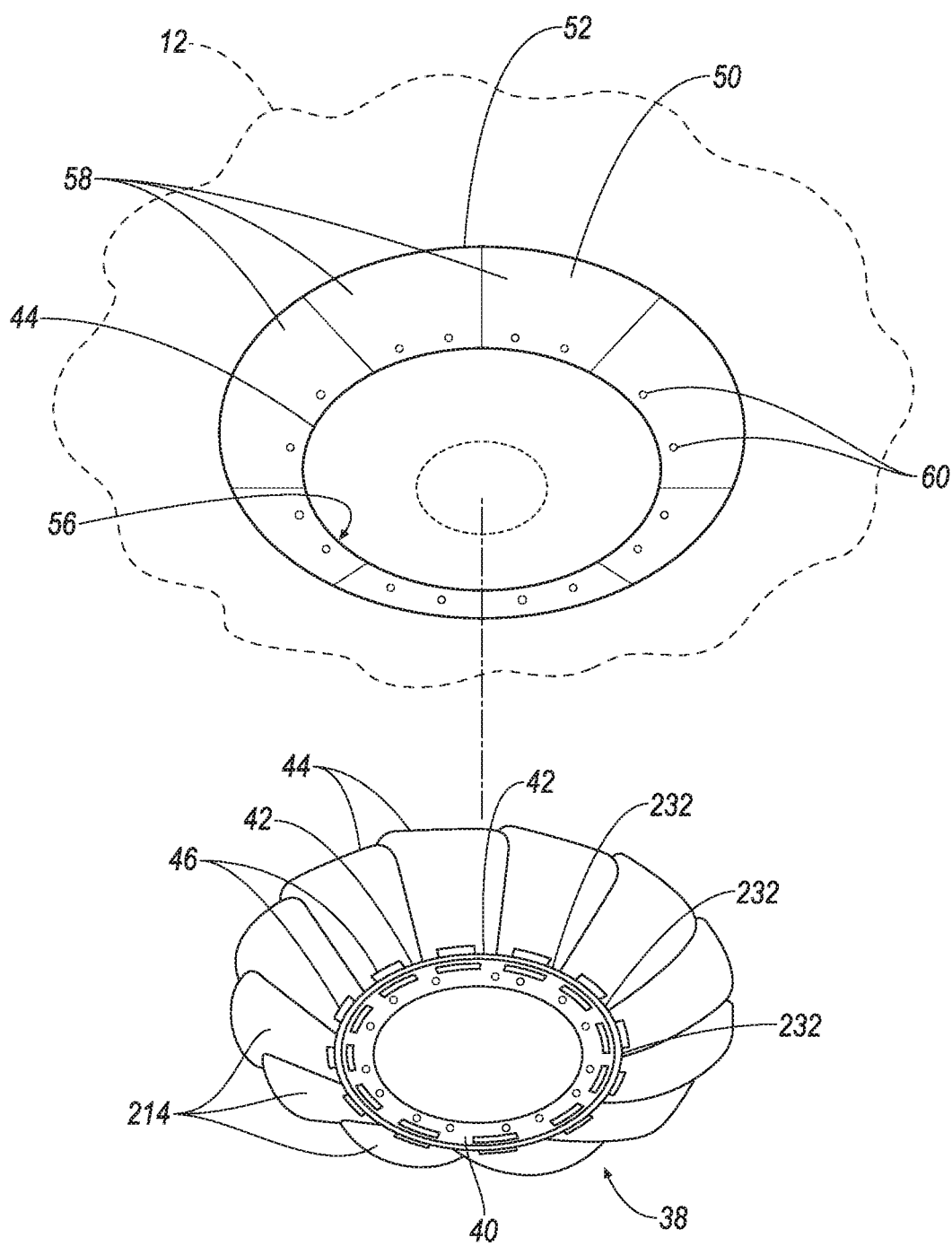
FIG. 13 is a perspective view during one stage of assembly of the airbag assembly of FIG. 9 with a reinforcement assembly spaced from the airbag.

With reference to FIG. 13, the base 40 may include stoppers 46 designed to slow or stop rotation of the reinforcements 214 in the deployed position. In other words, the stoppers 46 are in the rotational path of the reinforcements 214 at the deployed position. The stoppers 46 are fixed relative to the base 40 and the reinforcements 214 rotate relative to the stoppers 46 from the undeployed position to the deployed position. When the reinforcements 214 reach the deployed position, the reinforcements 214 contact the stoppers 46 and the stoppers 46 prevent further rotation.

Figure 12:
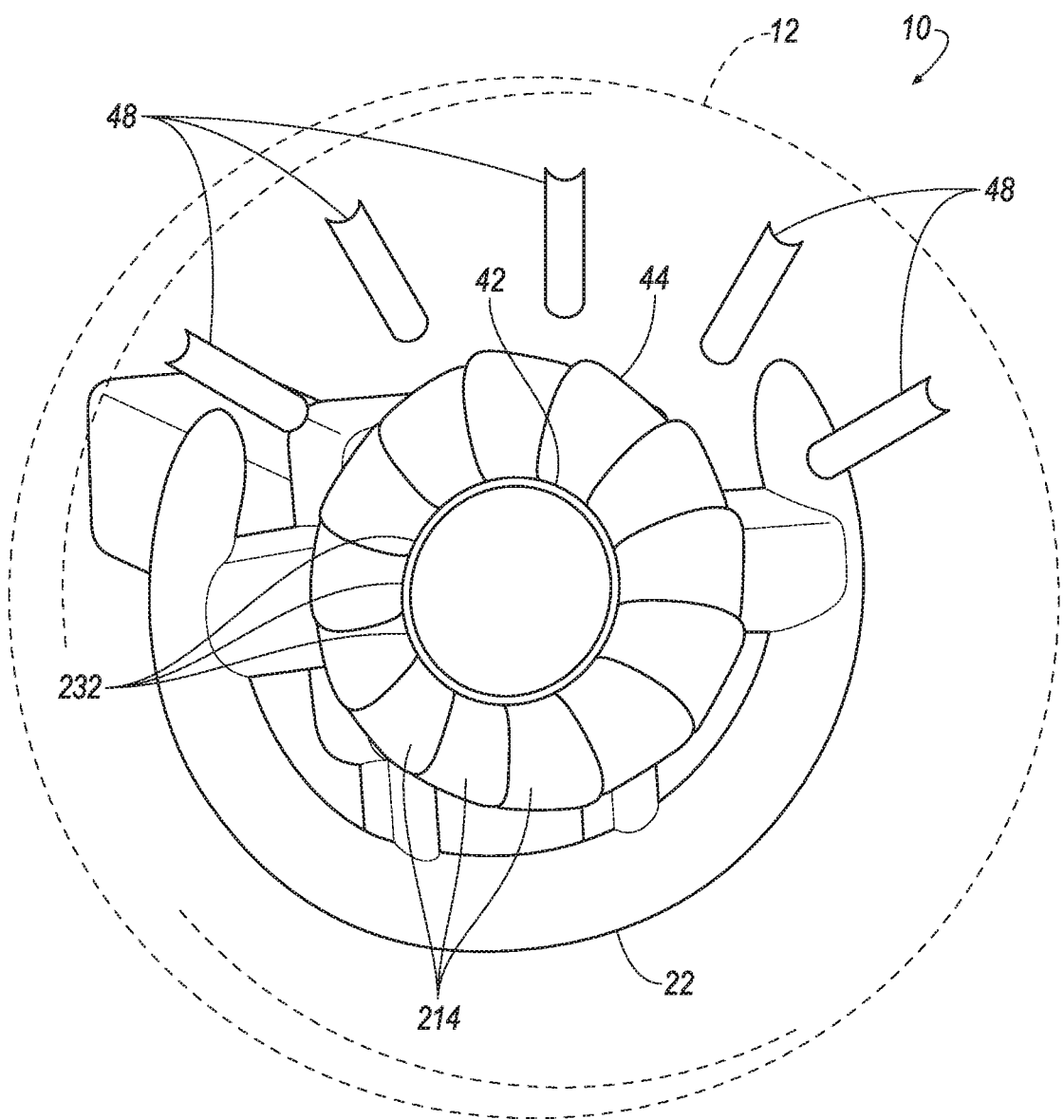
FIG. 12 is a perspective view of the airbag assembly of FIG. 9 with the airbag in the inflated position and the reinforcements in a deployed position.

With reference to FIGS. 7-8 and 12, the airbag assembly 10 may include inserts 48 fixed to the airbag 12 and spaced from the reinforcements, 214. The inserts 48 provide addition stability and/or reinforcement 214 to the airbag 12 in the inflated position. The inserts 48 may be positioned to act in combination with the reinforcements 214 to reinforce the airbag 12 at the gap 24. The inserts 48 may be elongated radially relative to the housing 28.

Each insert 48 may be a bistable structure, i.e., a structure that has two stable mechanical positions. The two stable mechanical positions may be a rolled position and a flattened position. In other words, when in the rolled position, the insert 48 remains in the rolled position absent external force applied to the insert 48, and in the flattened position, the insert 48 remains in the flattened position absent external force applied to the insert 48. As one example, the insert 48 may be curved about a longitudinal axis of the insert 48. The insert 48 may be rolled about an axis perpendicular to the longitudinal axis, and when unrolled to the flattened position with the curve along the longitudinal axis, the curve about the longitudinal axis stabilizes the insert 48 in the flattened position. In the rolled position, the curve about the longitudinal axis urges the insert 48 to coil about the axis perpendicular to the longitudinal axis.

The inserts 48 may be of the same type of material or different type of material than the reinforcements 214 and may be fixed to the airbag 12 in any suitable fashion, e.g., stitching and/or adhesive. As one example, the inserts 48 may be thin metal encapsulated in a thin plastic and/or fabric. When the airbag 12 is in the uninflated position, the inserts 48 may be in the rolled position. As the airbag 12 inflates, the airbag 12 pulls the inserts 48 to unroll the inserts 48 to the flattened position with the curve along the longitudinal axis (as shown in FIGS. 8 and 12), the inserts 48 reinforce the airbag 12. The inserts 48 may be positioned to be rolled such that the impact of the occupant is opposite the stable rolled position of the inserts 48. In other words, the insert 48 has a spine along the longitudinal axis (i.e., where the insert is curved about the longitudinal axis) that protrudes toward the occupant and the insert 48 has a cupped recess extending along the longitudinal axis that faces away from the occupant.

Figure 14:
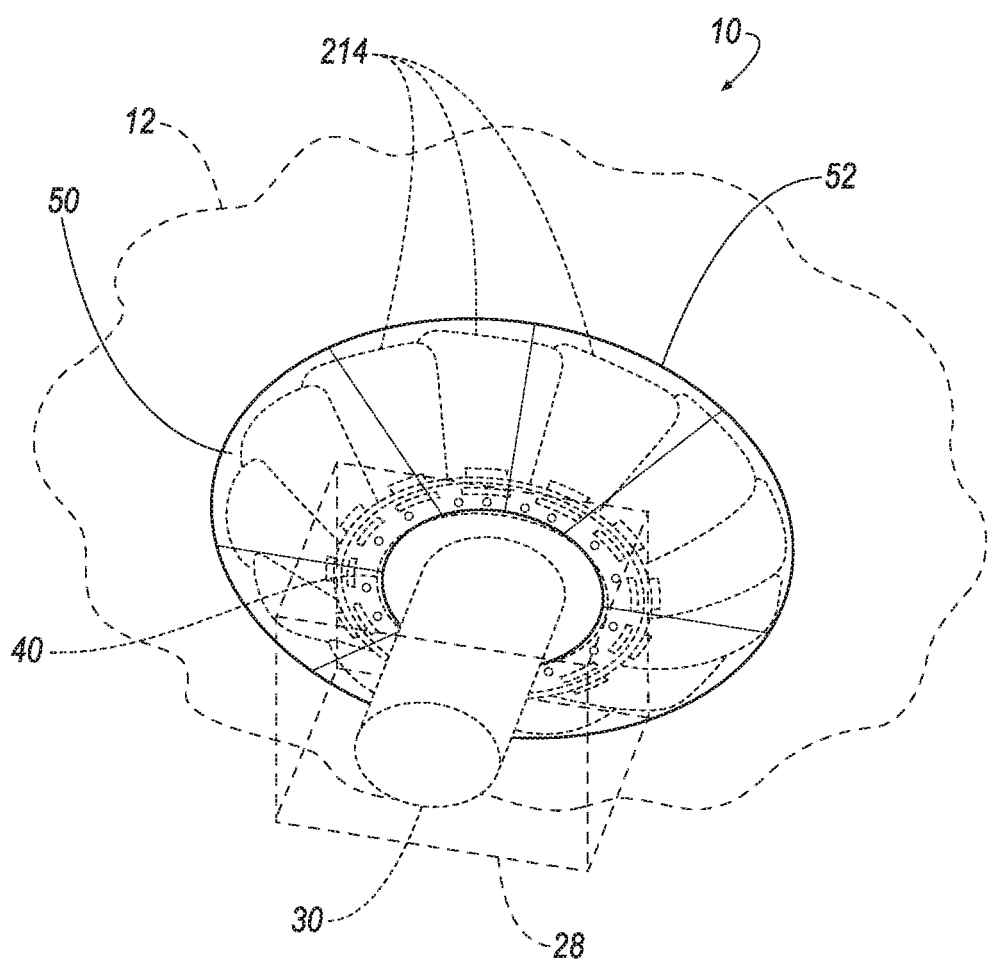
FIG. 14 is a perspective view after assembly of the reinforcement assembly to the airbag.

FIGS. 13-14 show the assembly of the reinforcement assembly 38 to the airbag 12. Specifically, the airbag 12 includes a flap 50 having an annular shape. An outer periphery 52 of the flap 50 is fixed the airbag 12 and an inner periphery 54 of the flap 50 is disconnected from the airbag 12 to define a pocket 56. The reinforcements 214 are inserted into the pocket 56 and fixed to the airbag 12. In the example including the base 40 in FIGS. 13 and 14, the flap 50 may be fixed to the base 40 of the reinforcement assembly 38, e.g., with fasteners, stakes, and/or adhesive, etc. For example, the flap 50 may include holes 60 for connection to the base 40. The flap 50 may be continuous in the annular shape or may include individual panels 58 that are disconnected from each other to aid in receipt of the reinforcements 214. In an example including individual panels 58, the individual panels 58 may be fixed together after assembly of the reinforcement assembly 38 to the airbag 12. As shown in FIG. 14, the inflator 30 may extend through the base 40 when assembled to the housing 28. After assembly of the reinforcement assembly 38 to the airbag 12, the airbag 12 may be folded in the housing 28.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag assembly comprising:
an airbag inflatable to an inflated position; and
reinforcements that are rigid relative to the airbag and fixed to the airbag and moveable with the airbag to the inflated position, the reinforcements being connected to each other in a round pattern;
wherein the reinforcements are supported entirely by the airbag.

2. The airbag assembly of claim 1, wherein the reinforcements are pivotally connected together as a radially expandable linkage.

3. The airbag assembly of claim 1, wherein each of the reinforcements is hinged to at least two adjacent ones of the reinforcements.

4. The airbag assembly of claim 1, wherein the reinforcements are pivotally connected together as an unfoldable linkage.

5. The airbag assembly of claim 1, wherein each of the reinforcements is elongated between two ends, the two ends being hinged to adjacent ones of the reinforcements.

6. The airbag assembly of claim 5, wherein each of the reinforcements has a midpoint hinged to a midpoint of an adjacent one of the reinforcements.

7. The airbag assembly of claim 1, wherein the reinforcements are links connected together as a linkage, the links are connected to each other and are rigid relative to the airbag, the linkage being fixed to the airbag and moveable with the airbag to the inflated position.

8. The airbag assembly of claim 7, wherein each of the links is hinged to at least two adjacent ones of the links.

9. The airbag assembly of claim 7, wherein the links are pivotally connected together.

10. The airbag assembly of claim 9, wherein the linkage is round.

11. The airbag assembly of claim 7, wherein each of the links is elongated between two ends, the two ends being hinged to adjacent ones of the links.

12. The airbag assembly of claim 11, wherein each of the links has a midpoint hinged to a midpoint of an adjacent one of the links.

13. An airbag assembly comprising:
a housing;
an airbag supported by the housing and inflatable to an inflated position; and
pairs of links each including an inner link connected to the housing and an outer link connected to the inner link and to the airbag, the inner link being rigid relative to the airbag and the outer link being flexible relative to the inner link; and
a tether extending between and connected to the inner link and the outer link.

14. The airbag assembly as set forth in claim 13, further comprising a revolute joint between the inner link and the housing.

15. The airbag assembly as set forth in claim 13, further comprising cross links connecting adjacent ones of the outer links.

16. The airbag assembly as set forth in claim 15, wherein each of the cross links is hinged between the adjacent ones of the outer links.

17. An airbag assembly comprising:
an airbag inflatable to an inflated position; and
reinforcements that are rigid relative to the airbag and fixed to the airbag and moveable with the airbag to the inflated position, the reinforcements being connected to each other in a round pattern;
a housing supporting the airbag, each of the reinforcements including an end hinged to the housing and an end fixed to the airbag;
wherein each of the reinforcements is curved about an axis extending through the ends of the reinforcement.

* * * * *